US005462665A

United States Patent [19]
Green

[11] Patent Number: 5,462,665
[45] Date of Patent: Oct. 31, 1995

[54] HYDROPHOBIC YARN FILTER FABRIC FOR A CONCRETE PRESS MOULD

[76] Inventor: Barrie E. Green, 21 Green Leas, Aston-on-Trent Derby, DE7 2UQ, United Kingdom

[21] Appl. No.: 159,814

[22] Filed: Nov. 30, 1993

[30] Foreign Application Priority Data

May 1, 1993 [GB] United Kingdom .................... 9309066
Nov. 1, 1993 [GB] United Kingdom .................... 9322488

[51] Int. Cl.$^{6}$ .......................... B01D 25/176; B01D 39/10

[52] U.S. Cl. .......................... 210/496; 210/499; 210/503; 210/508; 55/514; 55/524; 55/527; 55/DIG. 31; 100/101

[58] Field of Search .................................... 210/496, 503, 210/508, 499; 55/490, 494, 514, 515, 524, 527, DIG. 5, DIG. 31, DIG. 43, DIG. 44, DIG. 45; 100/101

[56] References Cited

U.S. PATENT DOCUMENTS

| | | | |
|---|---|---|---|
| 2,782,933 | 2/1957 | Monsarrat | 55/DIG. 44 |
| 3,779,389 | 12/1973 | Fant | 210/495 |
| 4,105,423 | 8/1978 | Latakas et al. | 55/501 |
| 4,322,232 | 3/1982 | Beane | 55/477 |
| 5,230,226 | 7/1993 | Saarikettu | 210/499 |

FOREIGN PATENT DOCUMENTS

| | | | |
|---|---|---|---|
| 5923 | 12/1979 | European Pat. Off. | 55/DIG. 43 |
| 94612 | 7/1980 | Japan | 55/DIG. 44 |
| 1103512 | 5/1986 | Japan | 55/DIG. 43 |

*Primary Examiner*—Robert A. Dawson
*Assistant Examiner*—W. L. Walker
*Attorney, Agent, or Firm*—Henry H. Skillman; Dann, Dorfman, Herrell and Skillman

[57] ABSTRACT

A filter for use in a concrete press mould, the filter comprising a fabric being knit or woven at least in part from heat meltable yarns and having a fabric density which permits the passage of water therethrough but prohibits the passage of particulate material, the filter being bounded around its periphery with at least one continuous imperforate band integrally formed with the fabric by fusion of said heat meltable yarns.

16 Claims, 4 Drawing Sheets

HYDROPHOBIC YARN FILTER FABRIC FOR A CONCRETE PRESS MOULD

The invention relates to a filter fabric, and a filter assembly for use in a press mould for moulding of cementitious products.

Press moulds are used for forming cementitious products such as paving slabs by compressing a mixture of water, sand and cement whilst simultaneously removing excess water usually assisted by vacuum. The mixture may contain other constituents such as aggregate, fibres (textile or glass etc), wood, straw etc.

The mixture is placed into a chamber of the press mould and compressed between the surfaces of a static table and piston operated platen.

Normal practice is to place a filter paper between the contacting surfaces of the mixture and the table and platen. This serves to prevent particulate material from entering the press mould ducts along which extracted water is conducted and also prevents cementitious product sticking to the surfaces of the table or platen on removal of the product.

A major limitation of paper when used as a filter medium is the necessity for a fresh piece of paper to be used on each surface during each product cycle. In addition, use of paper involves subsequent removal of the paper each time the product is removed from the mould.

Repeatedly removing and destroying the paper filter after use is a labour intensive, time-consuming and expensive task.

It is therefore desirable to provide a reusable filter that would allow water to filter out from a compressed mixture of water, sand and cement whilst preventing adhesion of the contacting surfaces. It is also desirable to enable the filter to be mounted for retention by the table/platen for repeated moulding of cementitious products.

According to one aspect of the present invention there is provided a filter fabric for use in a concrete press mould, the fabric being knit or woven, at least in part, from a hydrophobic yarn and having a fabric porosity which permits the passage of water therethrough but prohibits the passage of particulate material.

Preferably the fabric is woven or knitted so as to have a ground construction which provides integrity for the fabric and a plurality of surface yarns which are secured in the ground construction so as to define at least one face of the fabric which in use contacts the cementitious mixture, said surface yarns being arranged to define closely spaced side by side floats on one surface of the ground construction to collectively define a substantially continuous flat surface for said face.

According to another aspect of the present invention there is provided a filter fabric for use in a concrete press mould, the fabric having a knit or woven ground fabric construction and surface floats anchored in the ground construction which floats collectively define a face of the fabric for contacting concrete to be pressed, the fabric being constructed to permit passage of water therethrough but prohibit the passage of particulate material.

Preferably the floats lie flat against the ground construction and are of a length which enables the floats to peel away from the surface of the pressed concrete.

Preferably the fabric is knitted on a warp knitting machine and the surface yarns are incorporated into the ground construction using a fall plate.

Preferably the desired spacing between the side-by-side floats is achieved by adopting a suitable weight count for said surface yarns and/or adopting a suitable needle gauge.

Preferably at least the surface yarns are hydrophobic and are preferably made of polyvinylchloride or polypropylene.

According to another aspect of the present invention there is provided a filter assembly comprising a fabric, as defined above, secured about its periphery to a perforate plate adapted for detachable securance to a table or platen of a press mould.

Preferably the periphery of the fabric is secured to the plate by adhesion.

Preferably the peripheral edge of the fabric is defined by a fold, the fold being secured in face to face contact with the plate.

Preferably the folded edging is a continuous smooth surfaced band located at the periphery of the fabric, the integral band being preferably formed by fusing the knit or weave structure along and adjacent to the periphery of the fabric.

Preferably a porous sponge layer is provided between the plate and the fabric.

Preferably the ground construction is constructed to be flexible to enable it to peel away from the surface of the pressed concrete.

According to another aspect of the present invention there is provided a filter for use in a concrete press mould, the filter comprising a fabric being knit or woven at least in part from heat meltable yarns and having a fabric porosity which permits the passage of water therethrough but prohibits the passage of particulate material, the filter being bounded around its periphery with at least one continuous imperforate band integrally formed with the fabric by fusion of said heat meltable yarns.

Various aspects of the present invention will hereinafter be described in greater detail, by way of example, with reference to the accompanying drawings, in which.

Figure 1:
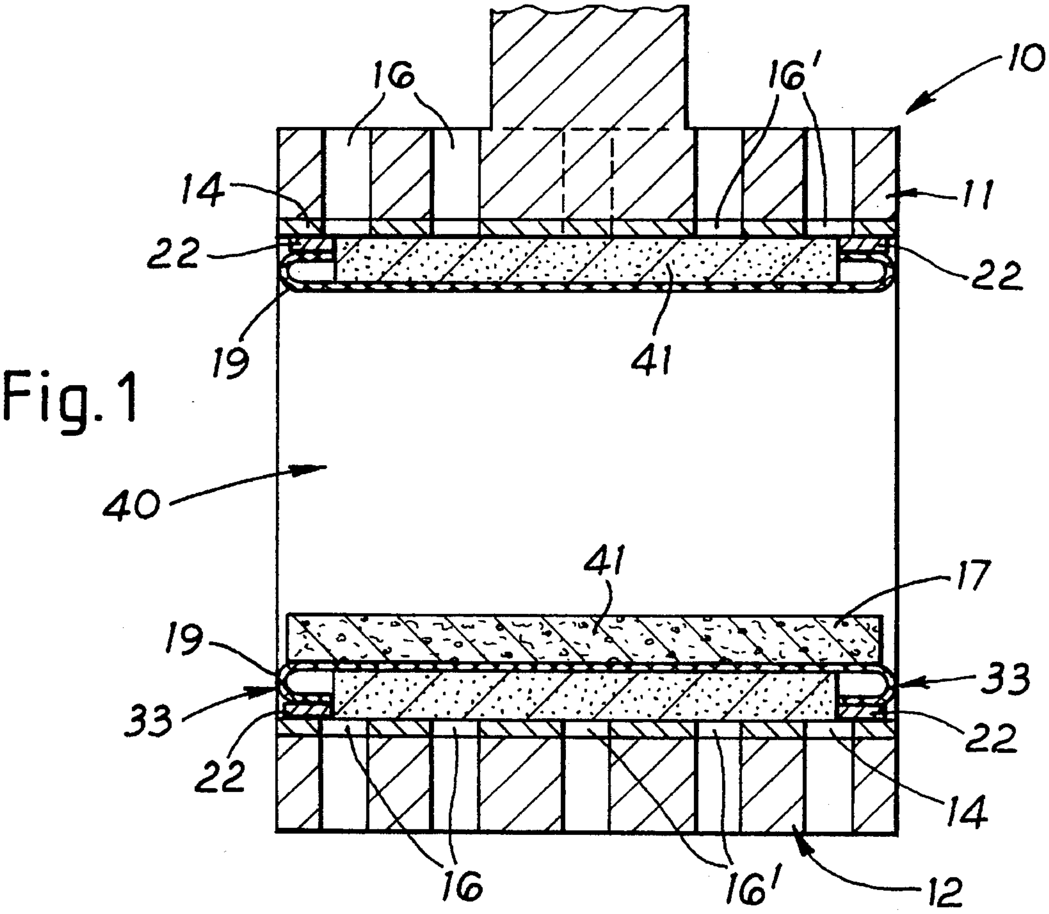
FIG. 1 is a side view of a press mould according to a first embodiment of the present invention.
Figure 2:
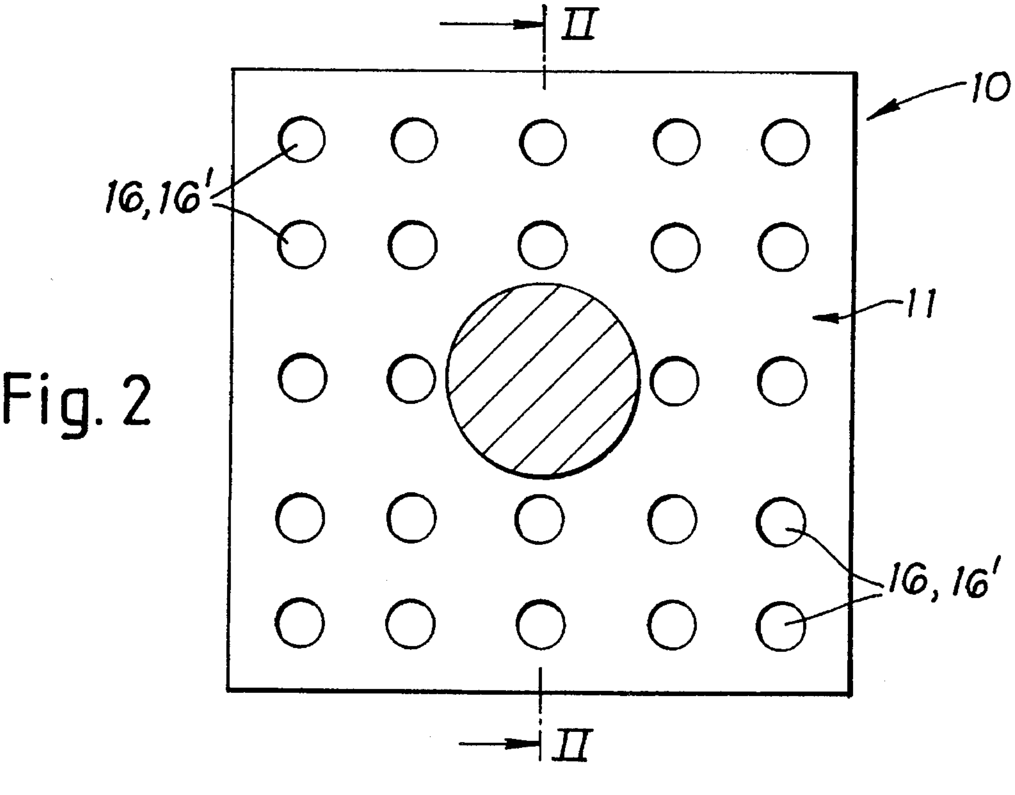
FIG. 2 is a plan view of FIG. 1.
Figure 3:
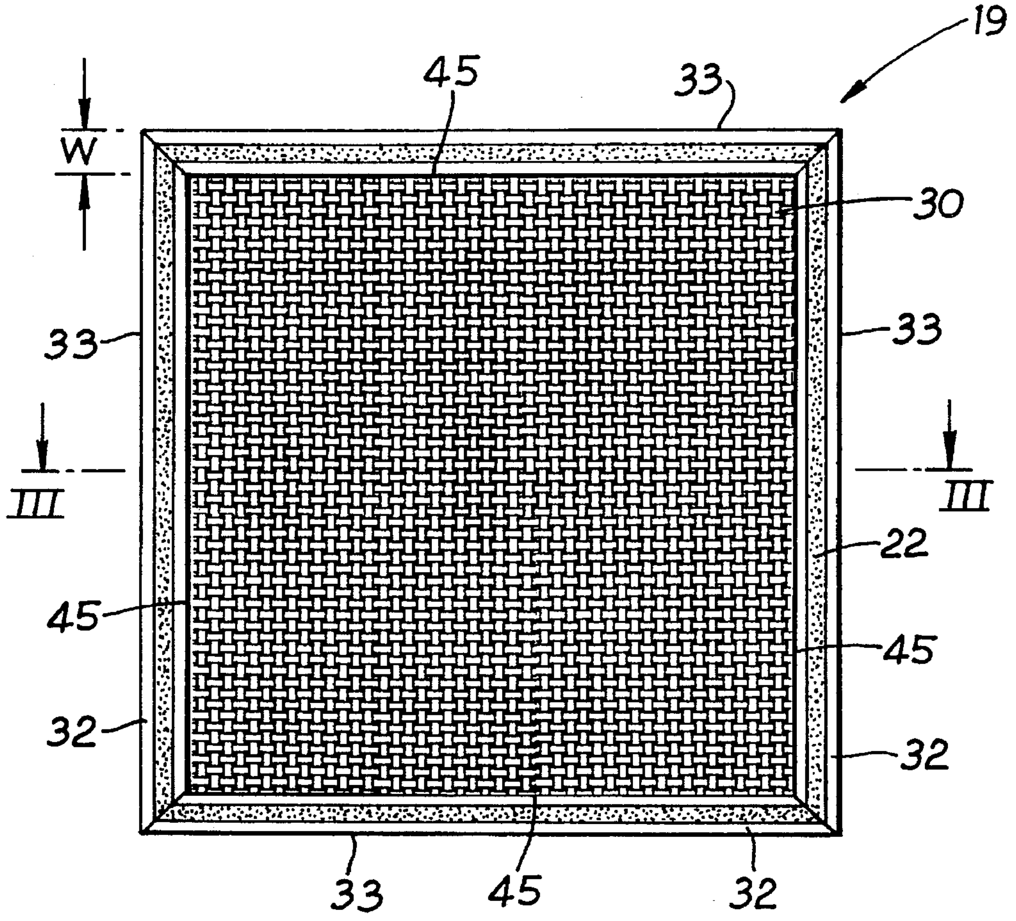
FIG. 3 is a plan view of a filter fabric according to the first embodiment.
Figure 4:
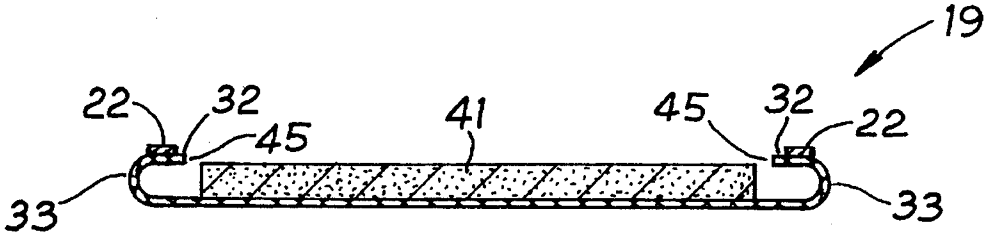
FIG. 4 is a section through III—III of FIG. 3.

Referring to FIGS. 1 to 5, there is shown a filter 19 for use in a concrete press mould 10 according to a first embodiment. The filter 19 comprises a fabric which is knit or woven from a hydrophobic yarn 30 to produce a fabric having a density which permits the passage of water 18 therethrough but prohibits the passage of particulate material such as sand or cement 17.

In the present example, the press mould is intended to produce rectilinear paving slabs. Therefore the filter fabric 19 shown in the first embodiment is generally square shaped allowing it to fit within a chamber 40 of the press mould 10. However, it must be appreciated that any alternative shape of filter 19 may be used in adapting it to fit a particular cross-section of chamber for moulding alternative shapes of slabs or other products.

The filter fabric 19 is preferably knitted on a raschel warp-knitting machine and is preferably a fall plate type fabric. A suitable fabric may be produced on a raschel warp-knitting machine having a 12 gauge needle bar and in which 3 guide bars are fully threaded with a hydrophobic yarn such as polypropylene yarn and arranged to undergo the following lapping motions, viz

| | |
|---|---|
| Guide bar 1 | 1-0/0-1 repeat |
| Guide bar 2 | 1-0/2-3 repeat |
| Guide bar 3 | 2-3/1-0 repeat |

Figure 5:
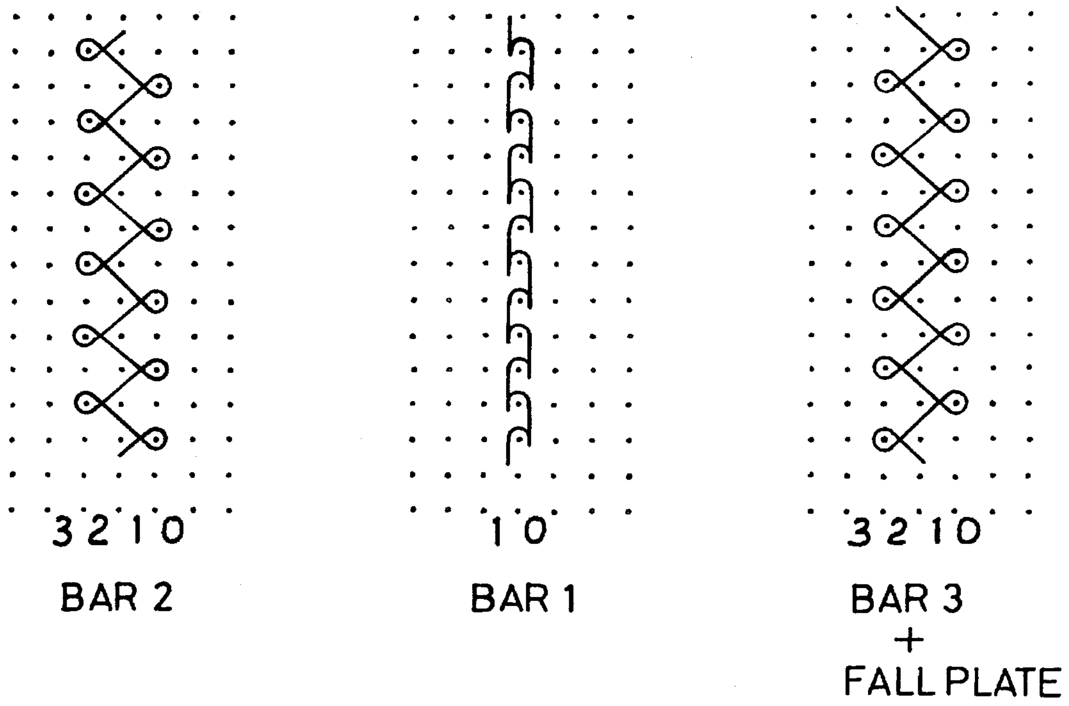
FIG. 5 is a lapping diagram for producing a warp knitted filter fabric according to the present invention.

This is illustrated in FIG. 5.

A fall plate is located behind guide bar 3 and in front of guide bars 1 and 2 so that the yarns guided by bars 1 and 2 are knitted to create a ground construction and the yarns guided by guide bar 3 are not knitted but are connected to the ground construction by passing under the underlaps of the ground construction at the extremity of their movement so as to provide flat lying floats which lie on the top of the technical back of the fabric between the points of connection with the ground construction.

When knitted on a 12 gauge machine, the hydrophobic yarn for bars 1 and 2 preferably collectively have a yarn count of about 350–650 dtex, most preferably about 500–600 dtex. In addition, the courses per inch are preferably about 28–31, more preferably about 29–30.

Typically the yarn count for bar 1 is about 170 dtex and that for bar 2 is about 420 dtex. The yarn count for bar 3 is preferably in the region of 350 to 550 dtex, and is typically about 420 dtex.

It is envisaged that the lapping motions for guide bars may be varied from those given above.

The ground construction is produced by guide bars 1 and 2 and the lapping motions may be altered to provide different densities of fabric construction by for example altering the number of courses per inch which are knitted. This can also alter the flexibility of the fabric.

It is envisaged that guide bar 2 may undergo the following alternative lapping motions, e.g. 1–0/1–2 repeat or 1–0/3–4 repeat.

It is also envisaged that this lapping motion of bar 3 may be varied in order to provide a different float length. For example, shorter floats may be produced by a 2–1/1–0 lapping motion, or longer floats may be produced by a 3–4/1–0 or even a 4–5/1–0 lapping motion.

After knitting the fabric is preferably heat set, so that it retains its integrity when exposed to use in the press mould.

The above fabric defines a closely knit ground construction having closely spaced side-by-side floats defining a substantially continuous and flat face for the fabric. The closely spaced floats enables water to pass through but which due to the closeness of the yarns acts to restrain passage of cement/sand particles therethrough. Since the yarn is hydrophobic it is not wetted by the water and so on release of the mould parts the yarn is able to be peeled away from the surface of the compacted cement/sand mixture without wetted particles sticking thereto.

On separation the floats tend to be pulled from the surface of the fabric, and since the floats are secured at both ends and not in their middle the centre of the floats tends to lift and thereby enables separation from the surface of the compacted cement/sand mixture by a peeling action.

The length of the floats is chosen to provide the required peeling effect whilst maintaining the desired filtration effect. Preferably the float length is in the region of 2 to 4 mm, more preferably about 3 mm. In order to assist release of the loops from the pressed concrete, the yarn forming the floats is preferably smooth walled e.g. a flat yarn.

The ground construction is preferably knit in such a manner as to provide a relatively flexible material which on separation yields in the centre of the fabric and thereby provides a macro peeling effect across the face of the fabric.

Preferably the hydrophobic yarn used in producing the fabric is a non-textured yarn.

The filter fabric 19 of the first embodiment is adapted for mounting on a metal perforate plate 14, adapted for detachable securance to the table 12 and platen 11.

The fabric 19 is bounded about its periphery with an integral band 32 which, as shown, has been folded to overlie the remainder of the fabric. The corners of the folded over band 32 are preferably cut to define mitre joints. The band 32 is of a width 'W' and is formed by fusing the heat meltable yarn of the fabric 19 to form a smooth imperforate surface. A band of an adhesive in the form of a double-sided adhesive tape 22 is applied to the band 32. A strong bond is possible due to the smooth surface of band 32 and also the adhesive is shielded from the concrete due to the imperforate nature of the band 32.

Prior to mounting filter fabric 19 to plate 14 preferably a sponge layer 41, for example, of a porous foam plastics material, is placed between the fabric 19 and the plate 14. Preferably the size of the foam layer 41 is such that it lies within the inner boundary of edges 45 (FIGS. 3,4) and is also of a thickness that, on compression, it has substantially the same thickness as the thickness of band 32. In this way the face of the fabric is substantially flat over its entire length and width defined between the exterior fold 33 when under compression.

The sponge layer 41 is compressible and is capable of absorbing water. When the platen 11 compresses the mixture 17 onto table 12 the sponge layer 41 compresses flat and conveys water passed through the fabric 19 to exit ports 16,16'. As the platen 11 decompresses the sponge layers 41 expand and this helps to draw in surplus water that remains resident at the contacting surface of the filter 19 and compressed mixture 17 and facilitates separation.

It is envisaged however that the sponge layer 41 may be omitted or may extend inbetween the folded over band 32 and the remainder of the fabric 19.

When applied to plate 14, it will be appreciated that the edges of the filter 19 defined by fold 33 can be substantially contiguous with the edges of the plate 14 and thereby present a filter which extends across the full width and length of plate 14. Water is able to escape at the edges of the filter 19 by passage through the fabric underlying the folded over band 32.

Figure 6:
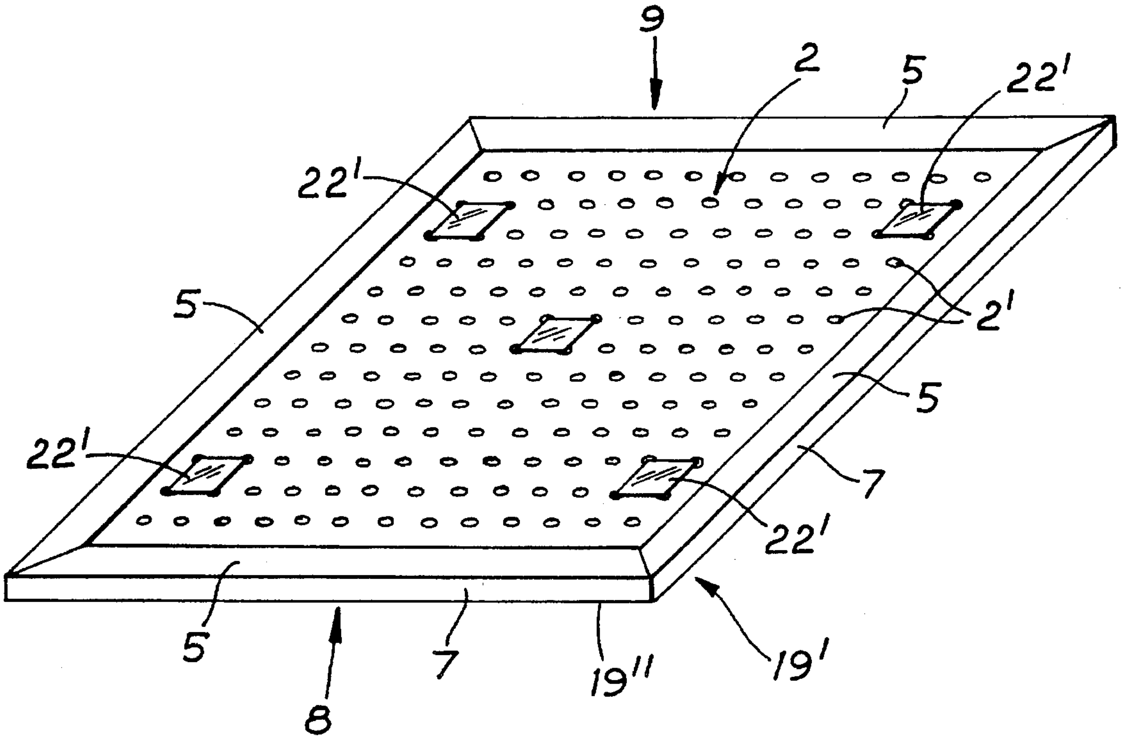
FIG. 6 is a perspective view of a filter according to a second embodiment of the present invention.
Figure 7:
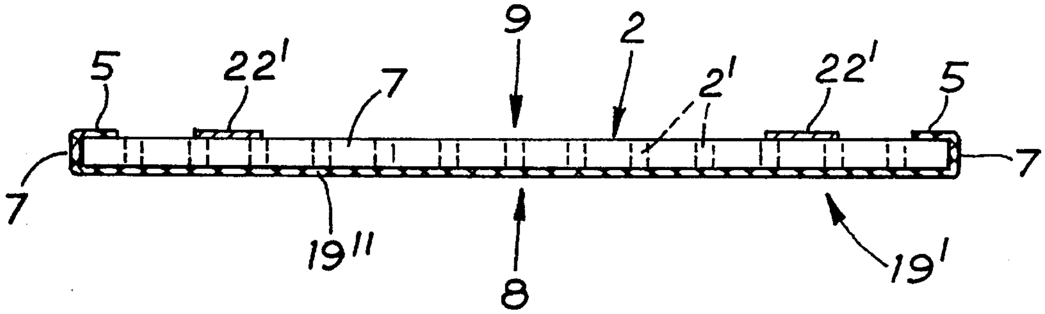
FIG. 7 is a side view of FIG. 6.

Referring to FIGS. 6 and 7 there is shown a filter 19' for use in a concrete press mould 10 as with the first embodiment.

The filter 19' comprises a fabric 19", having a knitted or woven structure substantially the same as that of the first embodiment, adapted for mounting on a mount 2. Preferably the mount 2 is made of a relatively thin plastic sheet such as polypropylene sheet having, inter alia, flexibility and hydrophobic properties. The thickness of the mount 2 preferably varies in proportion to the area of sides 8, 9, for example a range of area in the order of about 150 $mm^2$ to 400 $mm^2$ may result in a range of thickness in the order of about 1.5 mm to 3 mm. A plastics material such as polypropylene is substantially resistive to compressive deformation which results in good recovery after compression in the press mould 10.

The mount 2 has a pluraltiy of apertures 2' formed therein to allow the release of water from the mixture 17 under compression in the press mould 10. Preferably the apertures 2' have a range in diameter in the order of about 1 mm to 5 mm and the density of apertures 2' also varies according to their size, for example in the order of about 2/$cm^2$ to 5/$cm^2$.

In the embodiment shown the sponge layer 41 is dispensed with and the filter fabric 19" directly covers one side of the mount 2. The filter fabric 19" is wrapped around one side 8 of the mount 2 and over the edges 7 to leave overlapping marginal portions 5 which are folded over and adhered to the opposite side 9.

The filter fabric 19" is adehered to the opposite side 9 of the mount 2 preferably by means of an adhesive layer (not shown), for example double-sided adhesive tape, between the adjacent overlapping marginal portions 5 of the filter fabric 19" and the mount 2. Preferably the fabric about the marginal portions 5 of the filter 19' is then heat fused to bond the fabric to the mount 2 followed by heat fusing the edges 7 to accurately size the mount 2 to a dimension providing a snug fit for the filter 19' in the chamber 40 of the press mould 10 in order to prevent wear about the edges 7 when the filter 19' is in use.

The filter 19' is adhered to the surface of the table 12 or platen 11 of the press mould 10 preferably by means of double-sided adhesive tape 22' applied between a compression surface of the table 12 or platen 11 and the opposite side 9 of the filter 19'. The double-sided adhesive tape 22' may be applied as continuous elongate bands on the opposite side 9 or preferably as a plurality of individual blocks as shown in FIGS. 6 and 7.

As an alternative to using a fall plate warp knitting machine a similar fabric to the fabric of the two embodiments discussed (above) may be formed on a warp knitting machine not using a fall plate. Alternative ground fabrics can be knitted in the following way:

a) Using one, or a combination of, yarns preferably of count 50 dtex to 600 dtex;

b) Using a machine preferably between 12 and 28 gauge. Two examples for notation for the ground construction would be:

| | |
|---|---|
| i) Guide bar 2 | 0-1/1-0 repeat |
| Guide bar 3 | 0-0/2-2 repeat; or |
| ii) Guide bar 2 | 0-1/1-0 repeat |
| Guide bar 3 | 0-1/3-2 repeat |

To produce the loops shown a hydrophobic yarn is laid on top of either of these ground fabric constructions, or other similar constructions, a comparable fabric can be formed. For example, using guide bar 1 or a 12-guage machine, the following lapping motions may be possible 0–1/3–2 or 1–0/2–3 lapping motion on a 12 gauge machine. However, for finer gauge machines, longer throws are required to form the preferred float length in the region of 2 mm to 4 mm, more preferably 3 mm.

I claim:

1. A filter fabric for use in a concrete press mould containing a cementitious mixture, the fabric being knit, at least in part, from a hydrophobic yarn and having a fabric porosity which permits the passage of water therethrough but prohibits the passage of particulate material, the fabric being warp knitted so as to provide a two-bar knitted ground construction which provides integrity for the fabric and a plurality of surface yarns secured in the ground construction so as to define at least one face of the fabric adapted to contact the cementitious mixture, the yarn counts for both bars collectively ranging between 350–650 dtex, said surface yarns being arranged to define closely spaced side by side floats lying flat against the ground construction to collectively define a substantially continuous flat surface for said face.

2. A fabric according to claim 1 wherein the ground construction comprises a knitted fabric produced by the first bar undergoing a 1-0/0-1 repeat lapping motion.

3. A fabric according to claim 2 wherein the ground construction comprises a knitted fabric produced by the second bar undergoing a lapping motion selected from a 1-0/2-3 repeat, or a 1-0/1-2 repeat or a 1-0/3-4 repeat.

4. A fabric according to claim 3 wherein the flat lying floats are produced by a third bar undergoing a lapping motion selected from a 2-3/1-0 repeat or 2-1/1-0 repeat or a 3-4/1-0 repeat or a 4-5/1-0 repeat.

5. A filter assembly for a press mould having a table or platen comprising a perforate plate and a filter fabric according to claim 1 secured about the periphery of said perforate plate, said plate being adapted for detachable securance to the table or platen.

6. An assembly according to claim 5 wherein the periphery of the fabric is defined by a folded edging which is secured to the plate, the folded edging comprising a continuous smooth surfaced band formed by fusing the knit or woven fabric structure.

7. A fabric according to claim 1 wherein the flat lying floats have a length between 2 to 4 mm.

8. A fabric according to claim 7 wherein the flat lying floats have a length of about 3 mm.

9. A fabric according to claim 1 adapted to be peeled away from the concrete mixture after it has been pressed into concrete wherein the floats are of a length which enables the floats to peel away from the surface of the pressed concrete.

10. A fabric according to claim 1 wherein at least the surface yarns are hydrophobic.

11. A fabric according to claim 1 wherein the ground construction is constructed to be flexible to enable it to peel away from the surface of the pressed concrete.

12. A fabric according to claim 1 wherein the yarn count for the surface yarn is between 350–550 dtex.

13. A fabric according to claim 1 wherein the yarn count for the first bar is about 170 dtex and the yarn count for the second bar is about 420 dtex.

14. A filter assembly for a concrete press mould having a table or platen, a perforate plate having a front face and a rear face adapted for detachable securance to said table or platen, a fabric knit or woven, at least in part, from a hydrophobic yarn and having a fabric porosity which permits the passage of water therethrough but prohibits the passage of particulate material, the periphery of said fabric being defined by a peripheral band secured to the plate and comprising a continuous smooth surface formed by fusing the knit or woven fabric structure, the fabric being located on the front face and the peripheral band being located on and attached to the rear face.

15. An assembly according to claim 14 wherein the band is secured to the plate by adhesive.

16. A concrete press mould filter according to claim 14, the filter comprising a porous fabric being knit or woven at least in part from heat meltable yarns and having a fabric porosity which permits the passage of water therethrough but prohibits the passage of particulate material, said peripheral band being at least one continuous imperforate band integrally formed with the fabric by fusion of said heat meltable yarns.

* * * * *